United States Patent [19]

Kawamura

[11] Patent Number: 5,010,582

[45] Date of Patent: Apr. 23, 1991

[54] PICKUP DRIVING DEVICE FOR DISK PLAYER

[75] Inventor: Katsumi Kawamura, Tokorozawa, Japan

[73] Assignee: Pioneer Electronic Corporation, Tokyo, Japan

[21] Appl. No.: 476,948

[22] Filed: Feb. 8, 1990

[30] Foreign Application Priority Data

Apr. 4, 1989 [JP] Japan ................................. 1-84974

[51] Int. Cl.[5] ............................................. H02P 5/00
[52] U.S. Cl. ................................... 388/815; 388/810; 388/910
[58] Field of Search ................. 388/809, 810, 811–815, 388/821–823, 833; 330/129, 130, 131, 132; 360/75

[56] References Cited

U.S. PATENT DOCUMENTS

| | | | |
|---|---|---|---|
| 3,950,683 | 4/1976 | Lamsin | 388/807 |
| 4,007,428 | 2/1977 | Brown et al. | 330/129 |
| 4,185,248 | 1/1980 | Namura et al. | 330/132 X |
| 4,303,873 | 12/1981 | Hawkins | 388/822 |
| 4,471,276 | 9/1984 | Cudlitz | 388/815 |
| 4,510,423 | 4/1985 | Iwasama | 388/817 |
| 4,774,474 | 9/1988 | Beauducel et al. | 330/129 |

Primary Examiner—William M. Shoop, Jr.
Assistant Examiner—David Martin
Attorney, Agent, or Firm—Foley & Lardner

[57] ABSTRACT

A pickup driving device for a disk player is provided, wherein the gain of a negative feedback circuit for driving a slider motor is made variable and the gain is changed correspondingly to the operation mode of a disk player, which made it possible to increase the moving speed of a slider motor in a search mode without sacrificing the stability against external disturbances.

2 Claims, 5 Drawing Sheets

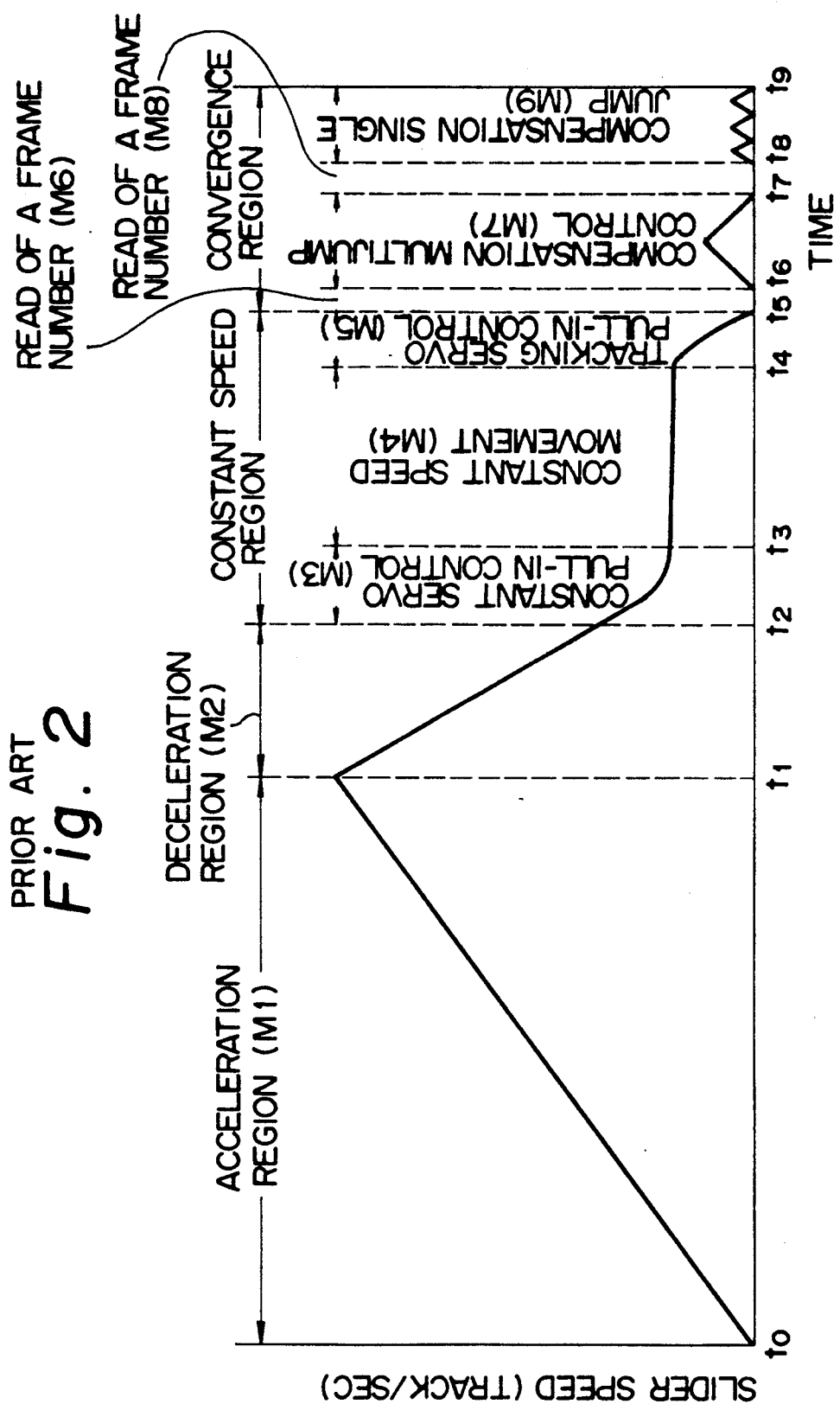

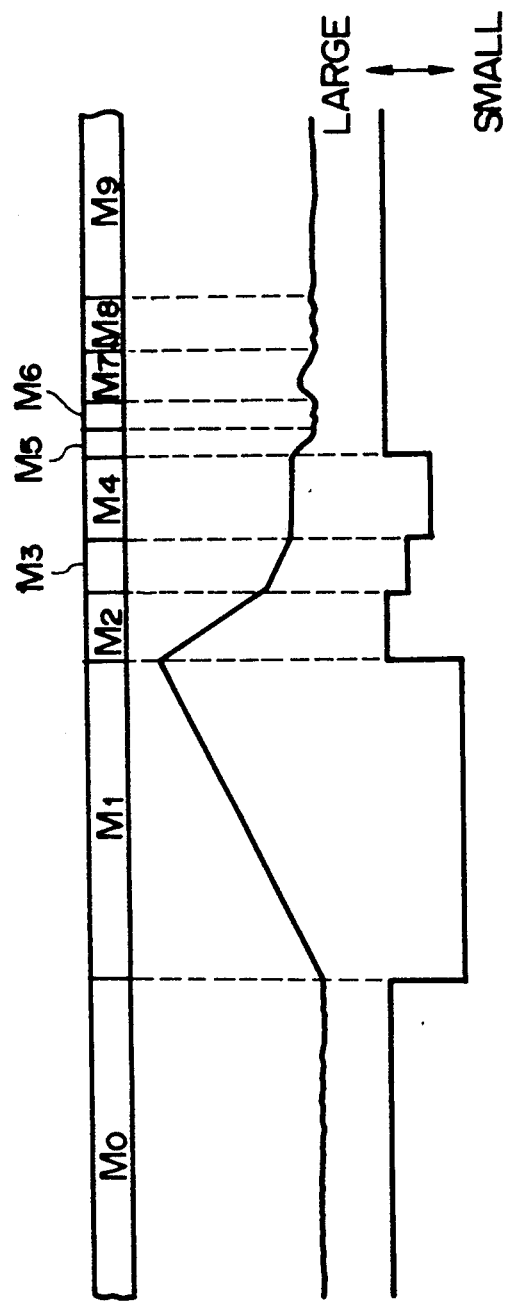

PICKUP DRIVING DEVICE FOR DISK PLAYER

BACKGROUND OF THE INVENTION

1. Field of the Invention

The present invention relates to a pickup driving device for a disk player for playing an information recording disk.

2. Description of the Related Art

An example of a conventional pickup driving device will be explained referring to FIG. 1.

As shown in FIG. 1, a control circuit 1 for a disk player comprises a microprocessor (hereinafter referred to as MPU), a memory, etc. The control circuit 1 controls the operation of a motor for driving a slider, not shown in the drawing, which moves freely in the radial direction of a disk while holding a pickup for reading a signal recorded on an information recording disk such as a video disk. The control circuit 1 supplies an FWD signal when the slider is to be moved in the forward direction and an REV signal when it is to be moved in the reverse direction to a voltage generator circuit 2. The voltage generator circuit 2 comprises an operational amplifier OP1 and resistors R21 to R24; the FWD signal is input to a negative-phase input terminal of the operational amplifier OP1, and the REV signal is input to a positive-phase input terminal of the operational amplifier OP1. Usually only one signal, an FWD signal or an REV signal, is generated. When a FWD signal is supplied to the operation amplifier OP1, it generates a negative voltage signal to make the motor generate a driving force in the forward direction; when a REV signal is supplied to it, it generates a positive voltage signal to make the motor generate a driving force in the reverse direction. The level of the voltage signal is decided by the amplitude or the pulse width of the FWD signal or the REV signal. The voltage signal is supplied to an output amplifier circuit 3 comprising an operational amplifier OP2 and resistors R31 to R32. The power amplifier circuit 3 power-amplifies the voltage signal and supplies it to a driving coil 4 of a linear motor etc. The driving coil 4 generates an electromagnetic force corresponding to the polarity and the level of a supplied current to energize a slider in a positive or negative radial direction.

A magnetic circuit, not shown in the drawing, is disposed along the moving path of the slider, and a speed detection coil 5 is provided for the slider to be in the proximity of the magnetic circuit. When the slider is moved by the motor, the speed detection coil 5 intersects magnetic flux and generates an electromotive force of a level corresponding to the speed of the slider. The electromotive force is supplied to an equalizer amplifier 7 through a buffer amplifier 6.

The equalizer amplifier 7 comprises an operational amplifier OP3, resistors R71 to R73, and capacitors C71 and C72; it reverse-amplifies the output of the speed detection coil 5 with a characteristic to compensate the moving speed versus output characteristic of the speed detection coil 5. The output of the equalizer amplifier 7 is supplied to a negative input terminal of the power amplifier circuit 3 through the resistor 32. The speed detection coil 5, the buffer amplifier 6 and the equalizing amplifier 7 constitute a negative feedback circuit.

The above-mentioned negative feedback circuit functions to suppress the influence of external disturbances and to increase the stability of a slider servo system during a disk is played.

In the constitution as described in the above, when a search command or a DC component of a tracking error signal from a tracking servo system, not shown in the drawing, is applied to the control circuit 1, the control circuit 1 outputs a FWD signal or a REV signal to operate a slider motor. The driving coil 4 of the motor energizes the slider in the positive direction during a FWD signal is being generated, and it energizes the slider in the negative direction during a REV signal is being generated.

In this manner, the slider is moved in the radial direction of a disk so that a pickup can be disposed at a desired read position. The present applicant proposed several high speed search methods for a target address in a disk player in a Japanese patent, laid-open No. 224964/87.

An example of the above-mentioned high speed search methods will be explained referring to FIG. 2.

FIG. 2 shows an operation chart of a method introduced as a high-scan subroutine. This method is suited to the case where a present address and a target address are apart by more than 3000 tracks. When a search command is given to a control circuit, the MPU decides the execution of the high-scan subroutine judging from the difference between a present address and a target address on a disk being played, and executes a control operation in a acceleration region (M1). A full power is supplied to the driving coil 4 of the motor for driving a slider; the slider is accelerated toward a target address. When a number of track lines crossed by an information reading point exceeds a predetermined number, the MPU executes a control operation in a deceleration region (M2) applying brakes on the motor. When a number of tracks till a target track becomes less than a first value the MPU moves to a control operation of a constant speed movement mode (M4) in which the slider is moved at a constant speed, through a constant speed servo pull-in control mode (M3).

For example, there are two kinds of speed servo control modes, 54 and 36 kilotracks/sec in a constant speed servo pull-in control mode (M3). In a deceleration region, when a remaining number of tracks becomes smaller than a first value or the slider speed becomes lower than 80 kilotracks/sec, the 54 kilotracks/sec speed servo control is executed which acts to control the track-crossing speed of an information reading point to be maintained at 54 kilotracks/sec, and when the remaining number of tracks becomes smaller than a second value, the 36 kilotracks/sec speed servo control is executed which acts to control the track-crossing speed of an information reading point to be maintained at 36 kilotracks/sec. When the remaining number of tracks becomes smaller than a third value a constant speed movement servo control (M4) is executed. As mentioned in the above, it is made possible to smoothly proceed from a deceleration region (M2) to a constant speed movement region (M4) by utilizing the speed servo controls as mentioned in the above.

When the number of remaining tracks reaches a fourth value, a tracking servo control (M5) is started; a frame number is read and a correct address of the present position of an information reading point is detected (M6). A compensation multijump (M7) control or a single-jump control (M9) is selected based on the difference between the present address and a target address. After a compensation multijump control is executed, the tracking servo control is started again and the frame number is read (M8) and a number of compensation single jumps (M9) corresponding to the number of remaining tracks are repeated till a target address is reached.

In the case of a disk player in which the high scan subroutine is executed, a slider can move at a high speed; therefore such a disk player has a merit that it can finish a search operation in a short time even when the present address and the target address of the slider are much apart from each other.

On the other hand as mentioned in the above, a pickup driving device has a negative feedback circuit. In the negative feedback circuit, the higher becomes the movement speed of a slider the more increases the negative feedback quantity. Because of this, even though the control circuit gives a command of full power, the increase of the speed of a slider is suppressed after the slider speed reaches a certain level.

SUMMARY OF THE INVENTION

An object of the present invention is to provide a pickup driving device for a disk player in which both stability of a pickup during a disk is being played and high speed movability of the pickup in a search operation can be obtained.

To achieve the above-mentioned object, a pickup driving device for a disk player is provided in which the gain of a negative feedback circuit is variable and the gain of the negative feedback circuit can be varied corresponding to the contents of an operation command, and the disk player comprises a slider for holding a pickup for a disk player, a motor for moving the slider in the radial direction of the disk, a voltage generation means for generating a driving voltage corresponding to an operation command, an amplifier circuit for amplifying the driving voltage and supplying it to the motor, a speed detection means for obtaining a speed signal corresponding to the moving speed of the slider, and a negative feedback circuit for superimposing the reverse-amplified speed signal on the driving voltage.

BRIEF DESCRIPTION OF THE DRAWINGS

FIG. 2 and FIG. 3 are explanatory drawings for explaining the operation of a conventional device; FIG. 7 is an explanatory diagram for explaining the operation of an embodiment.

DETAILED DESCRIPTION OF PREFERRED EMBODIMENTS

Figure 1:
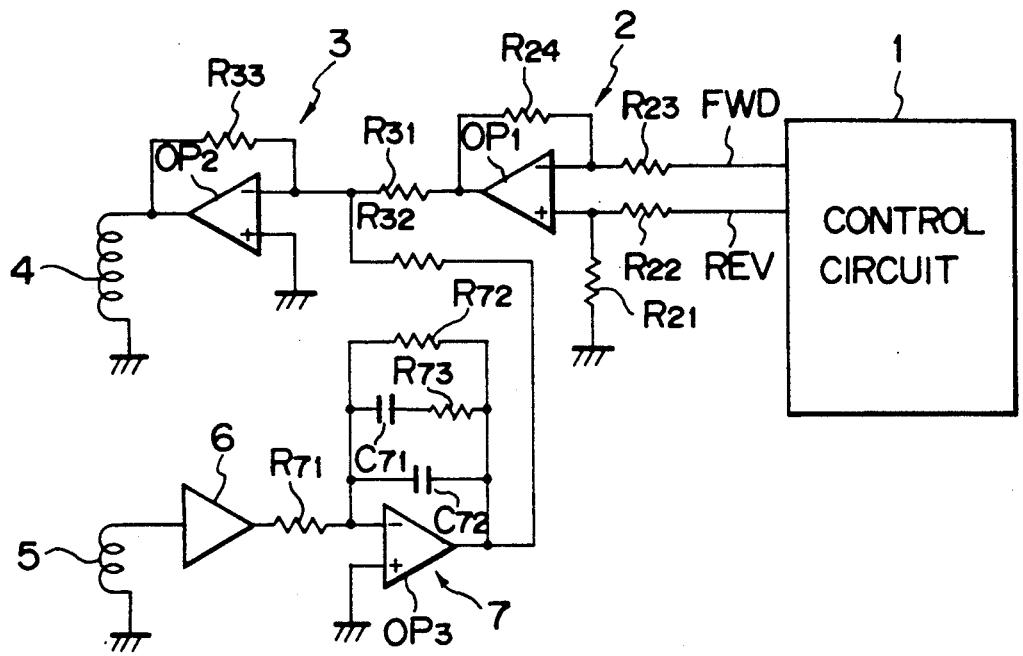
FIG. 1 is block diagram showing an example of a conventional device.
Figure 3:
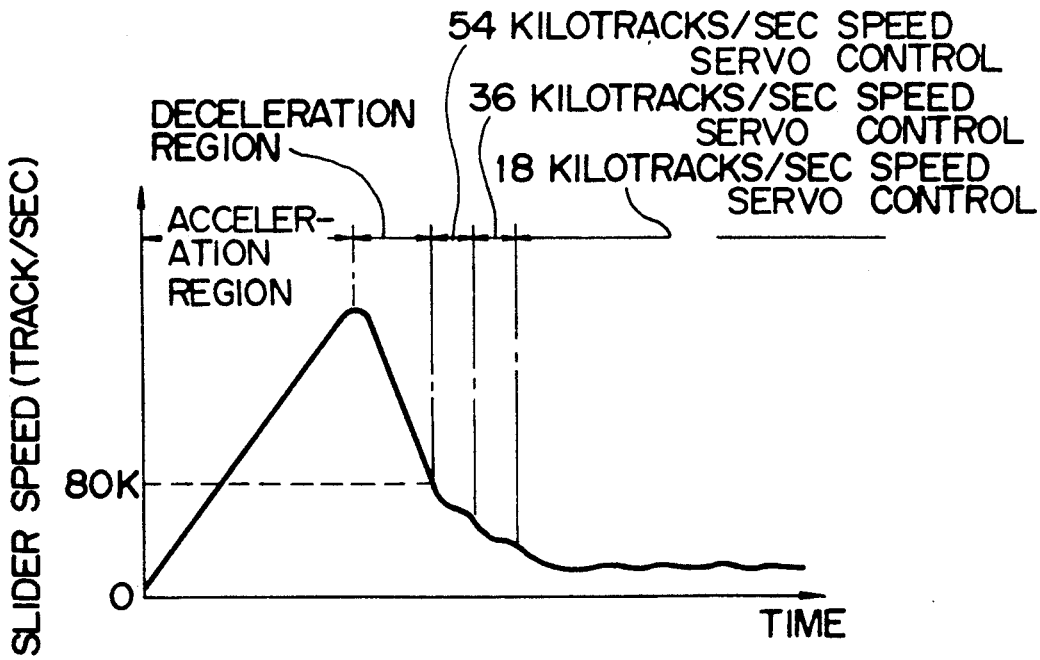

The embodiments of the present invention will be explained referring to the drawings in the following.

Figure 4:
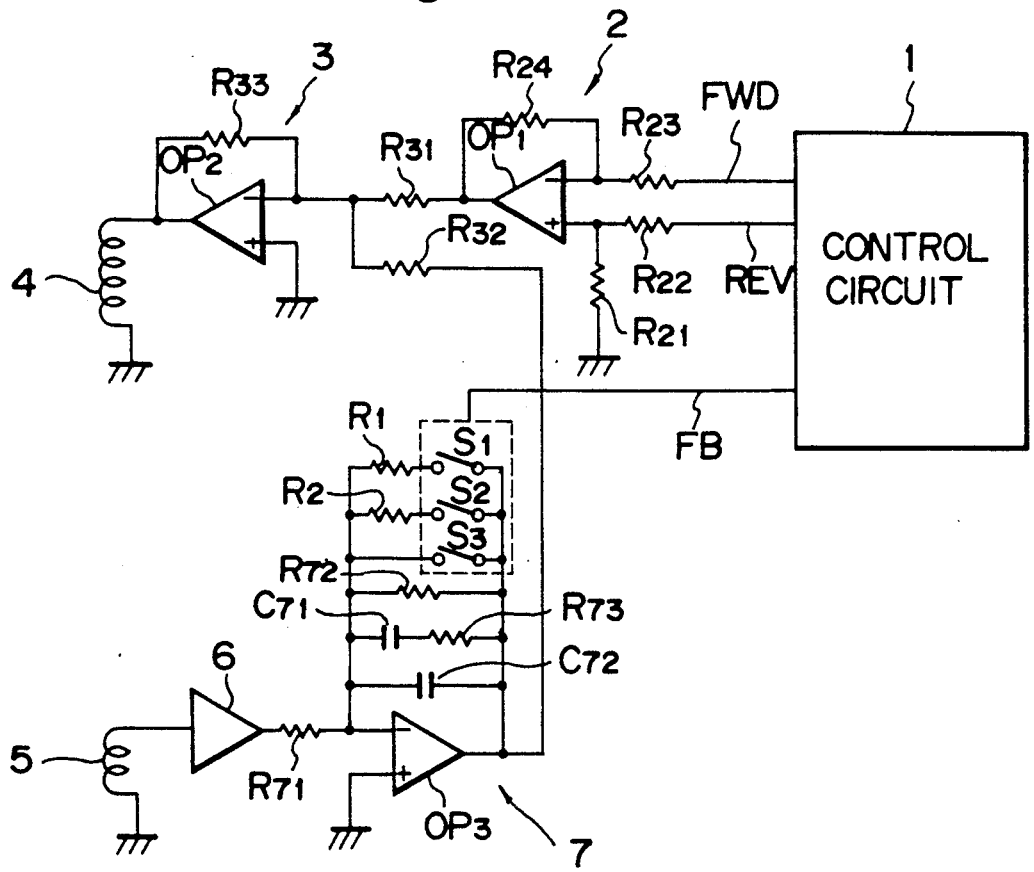
FIG. 4 is a block diagram showing an embodiment of the present invention.
Figure 5:
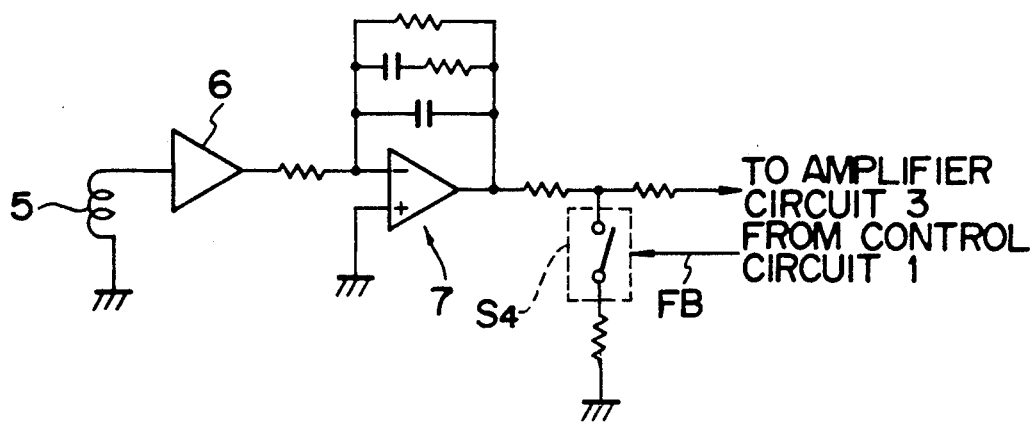
FIG. 5 is a block diagram showing another embodiment of the present invention.

FIG. 4 is a block diagram showing an embodiment of the present invention. The similar symbols are given to the parts which correspond to those in the circuit shown in FIG. 1, and so the explanation on them is omitted. To a time constant circuit comprising resistors R 72 and R 73, and capacitors C 71 and C 72 of the equalizer amplifier 7 a serial circuit comprising a resistor R1 and a switch S1, a serial circuit comprising a resistor R2 and a switch S2, and a circuit for short-circuiting comprising a switch S3 are connected in parallel. The switches S1 to S3 are, for example, transistor switches, and they are selectively controlled to make on or off by a feedback control signal FB supplied from the control circuit 1. When the switches S1 to S3 are all off, the gain of the equalizer amplifier 7 takes a standard value and gives a large negative feedback quantity to the output amplifier circuit 3. When the switch S1 is made on by a command from the MPU, the gain of the equalizer 7 is set at a second gain which is lower than the standard value, and when the switch S2 is made on by a command the gain of the equalizer amplifier 7 is set at a third value which is lower than the second gain. When the switch S3 is made on the input terminal and the output terminal of the operational amplifier OP3 are short-circuited, and the gain takes a minimum value. The other constitution is similar to that shown in FIG. 1.

When a plurality of equalizers, each of them having different gain, are connected in parallel and any one among them is made to operate, the same result as mentioned in the above can be obtained.

Figure 6:
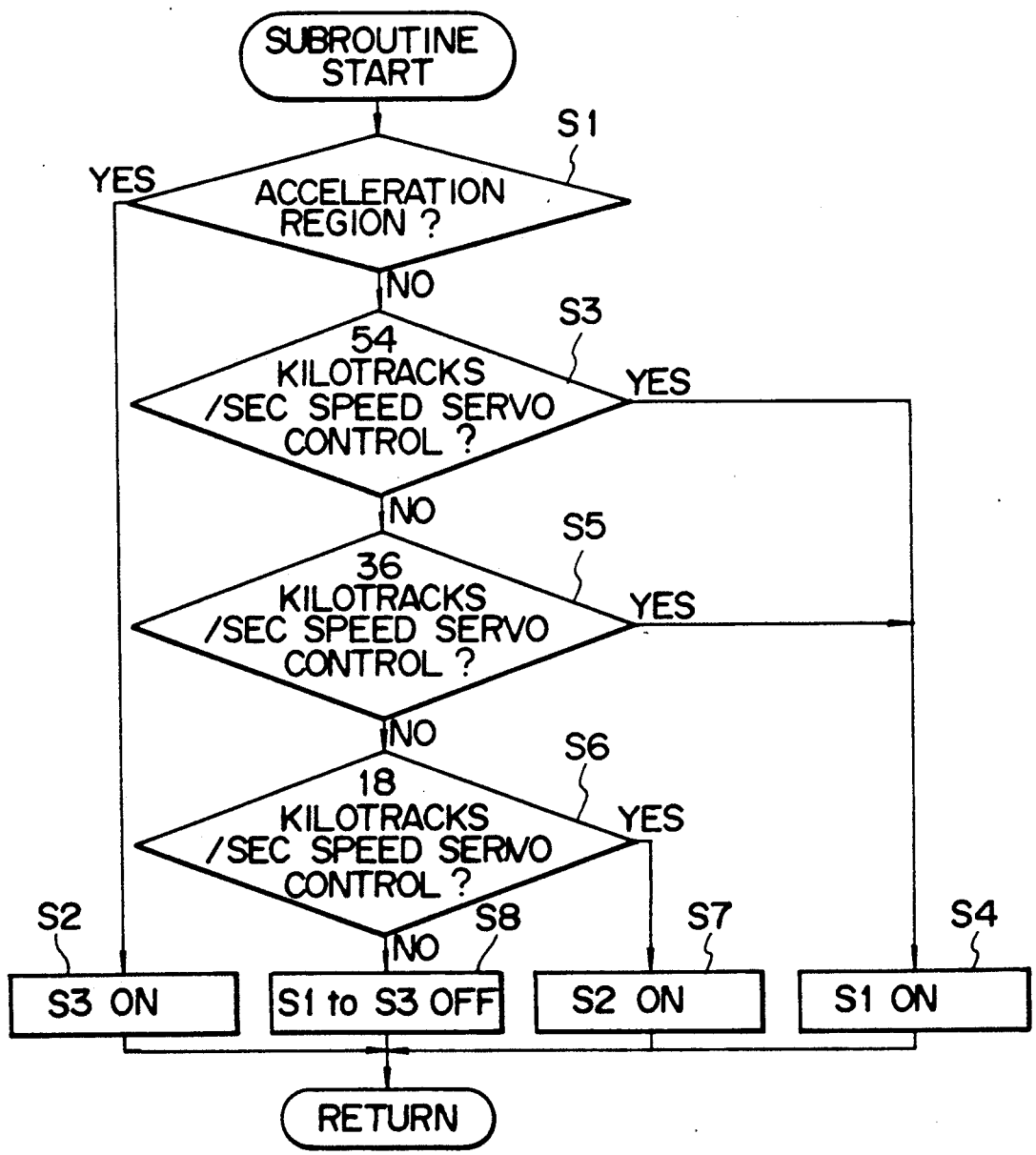
FIG 6 is a flow chart for explaining the operation of a control circuit.

In the constitution as described in the above, the MPU executes a subroutine as shown in FIG. 6: when the control circuit 1 is executing a control operation in an accelerating region (step S1) the switch S3 is made on (step S2); when the control circuit 1 is executing a speed servo control of 54 or 36 kilotracks/sec (step S3 and step S5) the switch S1 is made on (step S4); when a speed servo control of 18 kilotracks/sec is being executed (step S6), the switch S2 is made on (step S7).

When an operation is not relevant to any one in the above-mentioned controls, for example, when the device is in an operation mode such as a still mode or double speed playback mode, or in an operation in a deceleration region, all the switches S1 to S3 are made off (step S8).

When the setting of each switch is finished, the control returns to a main control program, and after that the subroutine is executed once in every fixed period. The on-off setting program of switches S1 to S3 can be included in the program of the control operation (operation mode) shown in FIG. 7 or FIG. 2.

When the subroutine is executed, the negative feedback quantity of the negative feedback circuit is changed as shown in FIG. 7C corresponding to the slider speed control as shown in FIG. 7B by the control operation as shown in FIG. 7A. In a play mode (M0), the switches S1 to S3 are set at off. Because of this, the gain of a negative feedback circuit is selected to be large and a negative feedback quantity is also made to be large, which makes the play mode stable.

In an acceleration region (M1), the switch S1 is set at on, so that the gain of the negative feedback circuit is made to be a minimum and a negative feedback quantity is also made to be small; therefore the output of the voltage generation circuit 2 is relayed to the output amplifier circuit as it is, which increases the output of the driving coil 4 to make the slider move at a high speed.

In a deceleration region (M2), to suppress the instability caused by brakes, switches S1 to S3 are all set at off, and a large negative feedback quantity is supplied.

In a constant speed servo pull-in control (M3), the switch S1 is selected to be on to widen the range of a speed servo control attaching importance to a brake force, by which the feedback quantity is set at the second level.

In a constant speed movement control (M4), since the braking is finished the switch S2 is made on to widen a constant speed servo range, and the negative feedback quantity is set at the third level.

In control operation (M5 to M9), there is no need to move a slider at a high speed, so that to cope with external disturbances the switches S1 to S3 are all set at off and a negative feedback quantity is made large to stabilize a playing operation.

As described in the above, the negative feedback quantity of a negative feedback circuit is controlled corresponding to a control mode (in other words, a condition of a command of the control circuit 1 for the voltage generation circuit 2), so that both stability in pickup driving in playing operation and high speed movability of a pickup in search operation can be obtained. The similar effect can be obtained in an arrangement, wherein a switch S4 for bypassing a feedback signal is provided on the way along a negative feedback loop and the on and off of the switch S4 is controlled by the control circuit 1 to adjust a negative feedback quantity.

In the embodiments, a pickup moving speed is detected by using a speed detection coil as a speed detection means, but a constitution in which a moving speed is detected by a number of crossing tracks per unit time of an information reading point, or the moving speed is detected based on the frequency of a readout RF signal output from a pickup is also suitable for speed detection.

A control corresponding to a motor moving speed can be executed by varying not only the gain of the equalizer amplifier 7 but also by varying the frequency characteristics of the amplifier.

As described in the above in the case of a pickup driving device for a disk player in the present invention, the gain of a negative feedback driving circuit of a motor for driving a slider holding a pickup is made variable, and the gain is made to vary corresponding to an operation mode of a disk player; therefore it is made possible to increase the moving speed of a slider motor in a search mode without sacrificing the stability against external disturbances in a play mode.

What is claimed is:

1. A pickup driving device for a disk player comprising: a slider for holding a pickup for a disk player, a motor for moving said slider in a radial direction of a disk, a voltage generation means for generating a driving voltage corresponding to an operation command, an amplifier circuit for amplifying said driving voltage and supplying it to said motor, a speed detection means for obtaining a speed signal corresponding to a moving speed of said slider, and a negative feedback circuit for reverse amplifying said speed signal and for superimposing the voltage to said driving voltage, wherein the gain of said negative feedback circuit is variable, and the gain of said negative feedback circuit is made to vary correspondingly to the contents of said operation command, wherein the gain of said negative feedback circuit is made high when the content of said operation command is a first operation mode in which said slider is moved at a low speed, and the gain of said negative feedback circuit is made low when the content of said operation command is a second operation mode in which said slider is moved at a high speed.

2. A pickup driving device for a disk player according to claim 1, wherein said first operation mode is a play mode or a still mode, and said second operation mode is a search mode.

* * * * *